United States Patent
Hamzeh

(10) Patent No.: US 11,240,165 B2
(45) Date of Patent: Feb. 1, 2022

(54) COMMUNICATION NETWORKS INCLUDING MULTI-PURPOSE SHARED COMMUNICATION MEDIUMS, AND ASSOCIATED METHODS

(71) Applicant: CABLE TELEVISION LABORATORIES, INC., Louisville, CO (US)

(72) Inventor: Belal Hamzeh, Louisville, CO (US)

(73) Assignee: Cable Television Laboratories, PLLC, Louisville, CO (US)

(*) Notice: Subject to any disclaimer, the term of this patent is extended or adjusted under 35 U.S.C. 154(b) by 67 days.

(21) Appl. No.: 16/414,668

(22) Filed: May 16, 2019

(65) Prior Publication Data

US 2019/0356603 A1    Nov. 21, 2019

Related U.S. Application Data

(60) Provisional application No. 62/672,527, filed on May 16, 2018.

(51) Int. Cl.

| | |
|---|---|
| H04L 12/891 | (2013.01) |
| H04L 12/46 | (2006.01) |
| H04L 12/709 | (2013.01) |
| H04L 12/801 | (2013.01) |
| H04W 76/16 | (2018.01) |
| H04W 88/16 | (2009.01) |
| H04W 92/02 | (2009.01) |

(52) U.S. Cl.
CPC ............ *H04L 47/41* (2013.01); *H04L 12/46* (2013.01); *H04L 45/245* (2013.01); *H04L 47/15* (2013.01); *H04W 76/16* (2018.02); *H04W 88/16* (2013.01); *H04W 92/02* (2013.01)

(58) Field of Classification Search
CPC ..... H04W 88/16; H04W 76/16; H04W 92/02; H04W 16/14; H04L 45/245; H04L 12/2898; H04L 47/15; H04L 12/2863; H04L 12/2867; H04L 12/66; H04L 12/46; H04L 12/2869; H04L 47/41
See application file for complete search history.

(56) References Cited

U.S. PATENT DOCUMENTS

| | | | | |
|---|---|---|---|---|
| 7,027,461 | B1* | 4/2006 | Bontempi | H04H 60/97 |
| | | | | 348/E7.07 |
| 9,986,423 | B2* | 5/2018 | Siomina | H04W 76/14 |
| 2012/0008554 | A1* | 1/2012 | Kim | H04W 76/12 |
| | | | | 370/328 |

(Continued)

OTHER PUBLICATIONS

Harry Newton, "Newton's Telecom Dictionary," 30th Edition, p. 191 (Year: 2016).*

*Primary Examiner* — Maharishi V Khirodhar
*Assistant Examiner* — Kenneth P Hunt
(74) *Attorney, Agent, or Firm* — PdZ Patent Law, PLLC

(57) ABSTRACT

A method for transmitting data in a communication network including a shared communication medium includes (a) transmitting local data between a first client node and a second client node according to a first data protocol, using a first shared communication medium, and (b) transmitting remote data between the first client node and a network hub according to a second data protocol different from the first data protocol, using at least the first shared communication medium.

18 Claims, 15 Drawing Sheets

(56) References Cited

U.S. PATENT DOCUMENTS

| | | | | |
|---|---|---|---|---|
| 2012/0210377 A1* | 8/2012 | Wong | ............... | H04N 21/64322 |
| | | | | 725/109 |
| 2014/0317294 A1* | 10/2014 | Ramesh | .............. | H04L 41/0896 |
| | | | | 709/226 |
| 2015/0373730 A1* | 12/2015 | Fujishiro | ............... | H04L 1/0025 |
| | | | | 455/450 |
| 2016/0020944 A1* | 1/2016 | Taylor | ................... | H04L 41/082 |
| | | | | 709/221 |
| 2016/0198518 A1* | 7/2016 | Baek | ..................... | H04W 24/10 |
| | | | | 370/329 |
| 2017/0005913 A1* | 1/2017 | Hampel | ................ | H04L 45/245 |
| 2017/0230919 A1* | 8/2017 | Siomina | ............. | H04W 52/383 |
| 2018/0160311 A1* | 6/2018 | Shaw | ................. | H04L 61/2007 |

\* cited by examiner

COMMUNICATION NETWORKS INCLUDING MULTI-PURPOSE SHARED COMMUNICATION MEDIUMS, AND ASSOCIATED METHODS

RELATED APPLICATIONS

This application claims benefit of priority to U.S. Provisional Patent Application Ser. No. 62/672,527, filed on May 16, 2018, which is incorporated herein by reference.

BACKGROUND

Many communication networks use a shared communication medium to enable multiple client nodes to communicate with a network hub. For example, cable communication networks commonly use a shared coaxial electrical cable to enable multiple cable modems to communicate with a cable headend, and optical communication networks frequently use a shared optical cable to enable multiple optical network terminals (ONTs) to communicate with an optical line terminal (OLT). Multiple client nodes may share a common communication medium, for example, by using the shared communication medium at different respective times and/or by using different respective frequency bands on the shared communication medium. Use of a shared communication medium promotes cost-effectiveness by eliminating the need to provide a respective cable for each client node.

DETAILED DESCRIPTION OF THE EMBODIMENTS

Need for communication networks is anticipated to significantly grow in the foreseeable future. For example, communication networks subscribers are increasingly using communication networks to obtain streaming content, e.g. steaming video and streaming audio. As another example, the emerging fields of virtual reality (VR) and augmented reality (AR) typically require transmission of large amounts of data via a communication network. Furthermore, small wireless base stations, sometime referred to as "small cells," are being rapidly deployed to support new wireless communication technologies, such as fifth-generation (5G) new radio (NR) wireless communication networks. Each small cell requires a communication network to provide backhaul data transmission between the small cell and a wireless packet core.

One way to meet increased communication network demand is to deploy additional communication media. For example, additional optical and/or electrical cables may be deployed between two points to increase communication network capacity between these two points. Additionally, a given communication medium can sometimes be replaced with a higher-capacity communication medium. For an example, an electrical cable can potentially be replaced with an optical cable to increase communication network capacity. While these techniques can be effective in increasing communication network capacity, they are frequently expensive. Additionally, adding or replacing communication cables may be disruptive, such as by requiring trenching and associated damage to paved surfaces and/or landscaping, to install underground cables.

Disclosed herein are communication networks and associated methods which help increase communication network capacity without requiring addition of communication media or replacement of communication media. The new communication networks achieve increased communication network capacity by enabling a shared communication medium to serve multiple purposes, e.g. to transmit data between client nodes on the shared communication medium, as well as to transmit data between client nodes and a network hub. In conventional communication networks, in contrast, a shared communication medium is used only for data transmission between client nodes and a network hub.

Thus, the new communication networks use a shared communication medium more-efficiently than conventional communication networks.

Figure 1:
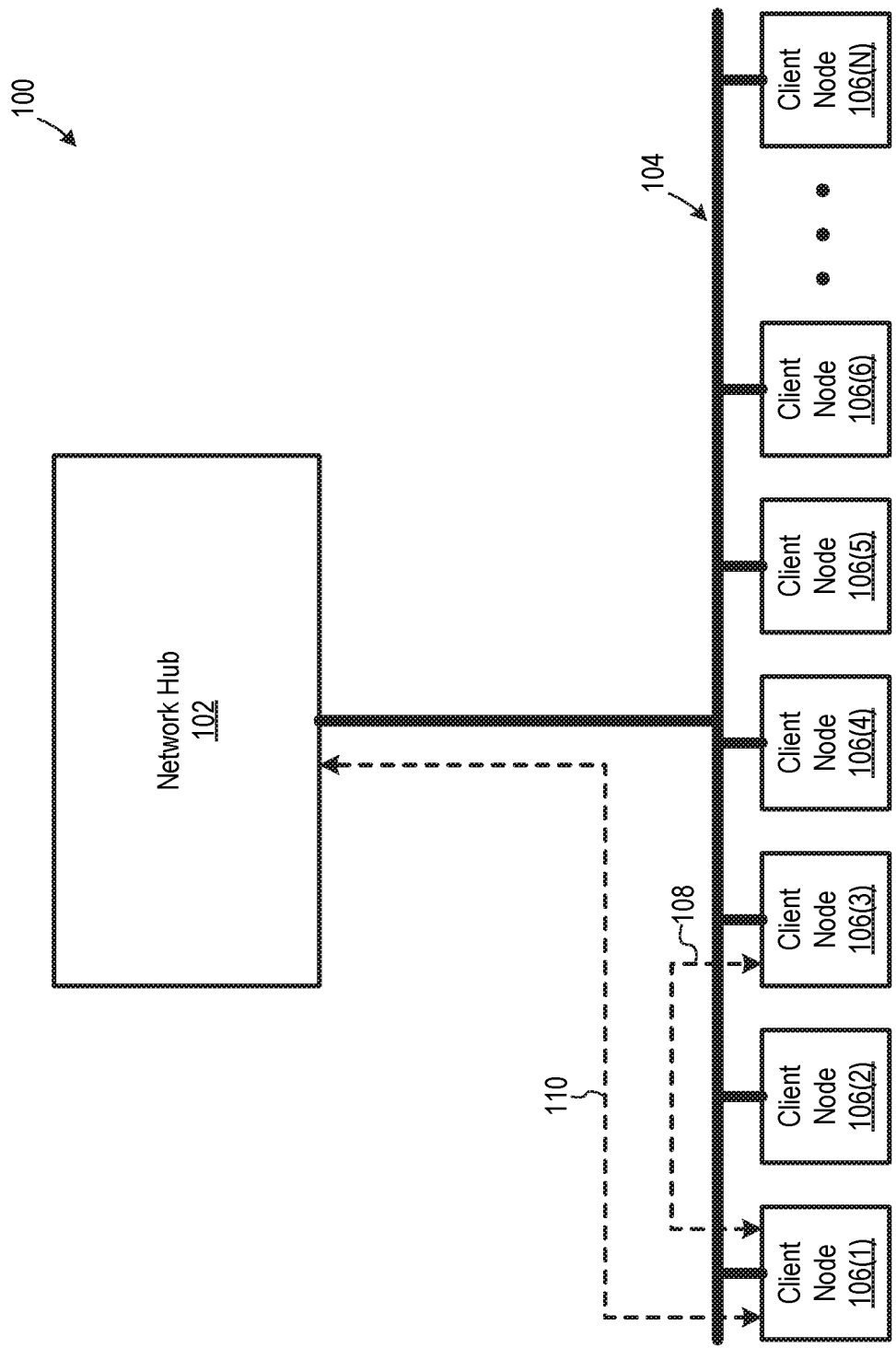
FIG. 1 is a schematic diagram of a communication network including a multi-purpose shared communication medium, according to an embodiment.

FIG. 1 is a schematic diagram of a communication network 100, which is one embodiment of the new communication networks which include a multi-purpose shared communication medium. Communication network 100 includes a network hub 102, a shared communication medium 104, and N client nodes 106, where N is an integer greater than one. Although FIG. 1 depicts communication network 100 with N being greater than 6, N could be 6 or less without departing from the scope hereof. In this document, specific instances of an item may be referred to by use of a numeral in parentheses (e.g., client node 106(1)) while numerals without parentheses refer to any such item (e.g., client nodes 106). Each client node 106 and network hub 102 are communicatively coupled to shared communication medium 104. In some alternate embodiments of communication network 100, however, there are one or more intervening communication mediums between shared communication medium 104 and network hub 102, such as discussed below with respect to FIG. 3.

Network hub 102 is a central network element of communication network 100. In some embodiments, network hub 102 includes one or more of a cable headend, a telecommunications central office, an OLT, a wireless communication network core, and a converged communication core (e.g. supporting both wireline and wireless communication). In embodiments where network hub 102 supports wireless communication, network hub 102 optionally supports one or more of the following wireless communication protocols: a long-term evolution (LTE) wireless communication protocol, 5G NR wireless communication protocol (e.g. licensed and/or unlicensed), a sixth generation (6G) wireless communication protocol, an unlicensed radio spectrum communication protocol (e.g. a Wi-Fi protocol), and extensions and/or variations thereof.

Shared communication medium 104 is used by each client node 106, as well as by network hub 102, to transmit information. In some embodiments, shared communication medium 104 is one or more of a coaxial electrical cable and an optical cable. One or more client nodes 106 are, for example, customer premises equipment (CPE), such as equipment located at a residence or a business. Examples of a customer premises equipment include, but are not limited to, a cable modem, a ONT, and/or a premises gateway. A premises gateway includes, for example, a communication device, such as a cable modem or an ONT, along with additional equipment, such as equipment providing networking functionality, data storage, and/or wireless communication (e.g. Wi-Fi or other unlicensed or licensed wireless communication). However, client nodes 106 are not limited to customer premises equipment. For example, in some embodiments, one or more client nodes 106 are a wireless base station, infrastructure equipment (e.g. utility or transportation equipment), network equipment (e.g. an amplifier or a repeater), or a connection to another communication network. Examples of possible wireless base stations include, but are not limited to, a LTE wireless base station, 5G NR wireless base station, a 6G wireless base station, an unlicensed radio spectrum wireless base station (e.g. a Wi-Fi or unlicensed NR), or extensions and/or variations thereof. Each client node 106 need not have the same configuration. For example, client node 106(1) could be CPE, and client node 106(2) could be a wireless base station.

Communication network 100 is configured to use shared communication medium 104 for at least two purposes. First, communication network 100 uses shared communication medium 104 to transmit local data between a least two client nodes 106 according to a first data protocol. FIG. 1 illustrates one example of local data transmission where local data 108 is transmitted between client node 106(1) and client node 106(3) using shared communication medium 104. Second, communication network 100 uses shared communication medium 104 to transmit remote data between client nodes 106 and network hub 102 according to a second data protocol different from the first data protocol. FIG. 1 illustrates one example of remote data transmission where remote data 110 is transmitted between client node 106(1) and network hub 102 using at least shared communication medium 104. Local data is data that is transmitted between two client nodes 106 without being transmitted through network hub 102, and remote data is data transmitted between a client node 106 and network hub 102. Examples of the first data protocol include, but are not limited to, a Wi-Fi-based data protocol, an Internet (IP) data protocol, and a content centric networking (CCN) data protocol. Examples of the second data protocol include, but are not limited to, a data over cable service interface specification (DOCSIS) data protocol, a ethernet passive optical network (EPON) data protocol, a radio frequency over glass (RFOG) data protocol, and a gigabit passive optical network (GPON) data protocol. In some embodiments where there are one or more intervening communication mediums between shared communication medium 104 and network hub 102, remote data may be transmitted according to one or more data protocols in addition to the second data protocol.

As discussed above, conventional communication networks use a shared communication medium for one purpose, i.e. to transmit data between client nodes and a network hub. Communication network 100, in contrast, uses shared communication medium 104 for at least two purposes, e.g. for transmission of both local and remote data. Therefore, communication network 100 can potentially achieve higher capacity than conventional communication networks with similar shared communication media. Additionally, the relatively short path between client nodes 106 via shared communication medium 104 helps minimize latency of local data transmission. For example, in some embodiments, latency of local data between client nodes 106 is less than ten milliseconds (ms). In contrast, distance between client nodes 106 and network hub 102 may be relatively long, potentially causing significant latency of remote data between client devices 106 and network hub 102. Additionally, Applicant has determined that communication network 100's ability to transfer local data between client nodes 106 in a peer-to-peer manner can be exploited to increase communication network performance and/or scalability. For example, network resources that are conventionally available only via network hub 102 can be deployed at one or client nodes 106, thereby reducing the need for client nodes 106 to communicate with network hub 102. Additionally, deploying network resources at client nodes 106 promotes high performance due to the minimal latency associated with local data transmission. Some examples of deploying wireless communication network resources and content delivery network resources at client nodes 106 are discussed below with respect to FIGS. 7-13.

Figure 2:
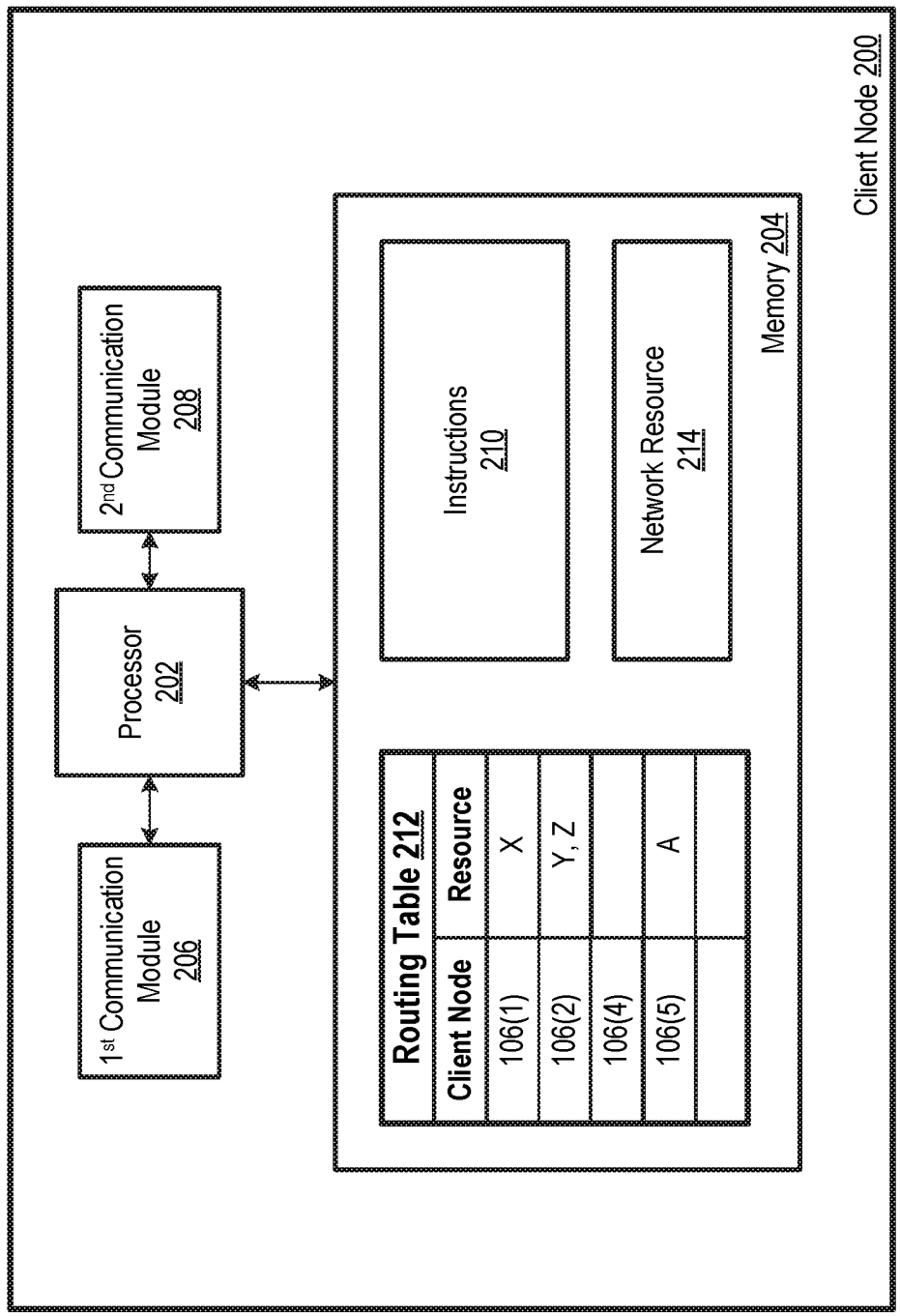
FIG. 2 is a block diagram of a client node, according to an embodiment.

FIG. 2 is a block diagram of a client node 200, which is one possible embodiment of a client node 106 instance. It should be appreciated, however, that client nodes 106 are not limited to the embodiment of FIG. 2. To the contrary, client nodes 106 can have essentially any configuration as long as they are able to communicate with other client nodes 106, as well as with network hub 102, using shared communication medium 104.

Client node 200 includes a processor 202, a memory 204, a first communication module 206, and a second communication module 208. Client node 200 may include additional elements without departing from the scope hereof. Processor 202 is configured to execute instructions 210 stored in memory 204 to control at least some aspects of client node 200. Instructions include 210, for example, firmware and/or software. First communication module 206 support communication with other client nodes 106/200 using the first data protocol, e.g. Wi-Fi-based protocol, an IP data protocol, or a CCN data protocol. Second communication module 208 supports communication with network hub 102 using the second data protocol, e.g. a DOCSIS data protocol, a EPON data protocol, a RFOG data protocol, or a GPON data protocol.

Although first communication module 206 and second communication module 208 are illustrated as being separate logical elements, they may share at least some common components. For example, in some embodiments, first communication module 206 and second communication module 208 share one or more physical layer elements, e.g. transceivers which electrically and/or optically interface client node 200 with shared communication medium 104. Additionally, while first communication module 206 and second communication module 208 are illustrated as being separate from processor 202 and memory 204, in some embodiments, first communication module 206 and second communication module 208 are at least partially implemented by processor 202 executing instructions 210.

In particular embodiments, local data may be attenuated on shared communication medium 104 so that a given client node 106/200 will not necessarily be able to directly communicate with all client node 106/200 instances using shared communication medium 104. For example, in one embodiment of communication system 100 (FIG. 1), client node 106(3) may able to communication with relatively-close client nodes 106(1), 106(2), 106(4), and 106(5), but client node 106(3) may be unable to communicate with more-distant client nodes 106(6)-106(N) due to signal attenuation on shared communication medium 104. Therefore, in certain embodiments, each client node 106 is configured to generate a list of other client nodes accessible to the client node via shared communication medium 104. For example, returning to FIG. 2, in some embodiments, processor 202 is configured to execute instructions 210 to generate a routing table 212 stored in memory 204. Routing table 212 includes a list of other client nodes 106/200 accessible to client node 200 via shared communication medium 104, and routing table 212 may include a list of available network resources hosted by each client node on the list.

For example, assume that client node 200 is client node 106(3) of FIG. 1 and that client node 200 can communicate with only relatively-close client nodes 106(1), 106(2), 106 (4), and 106(5). In this example, client node 200 accordingly generates routing table 212 listing client nodes 106(1), 106(2), 106(4), and 106(5), which are the client nodes accessible to client node 200. Additionally, assume that (a) client node 106(1) hosts network resource X, (b) client node 106(2) hosts network resources Y and Z, (c) client node 106(4) does not host any network resources, and that client node 106(5) hosts network resource A. Client node 200 accordingly generates routing table 212 to associate these network resources with their respective client nodes 106. In some embodiments, network resources X, Y, Z, and A include one or more of a wireless communication network control module and a content server.

In certain embodiments, client node 200 is further configured to route data as either local data or remote data depending on availability of an appropriate network resource at a client node 106/200. For example, assume again that client node 200 is client node 106(3) of FIG. 1, and assume that network resource Z is required at client node 200. In this example, client node 200 determines from routing table 212 that network resource Z is available at client node 106(2). Client node 200 accordingly accesses network resource Z from client node 106(2) using shared communication medium 104, i.e. client node 200 routes local data between client node 200 and network resource Z. Now assume that network resource B (not shown) is required at client node 200. Network resource B is not hosted by any of client nodes 106, and network resource B must therefore be accessed via network hub 102. Network resource B is, for example, a network resource available only via the Internet. Client node 200 determines from routing table 212 that network resource B is not available at client node 200 via another client node 106. Client node 200 therefore accesses network resource B via network hub 102, i.e. client node 200 routes remote data between client node 200 and network hub 102.

In particular embodiments, processor 202 further executes instructions 210 to create a network resource 214, which is hosted by client node 200 in memory 204. Network resource 214 is, for example, a wireless communication network resource or a content delivery network resource, in some embodiments. Network resource 214 may be directly accessed by other client nodes 200/106 via shared communication medium 104, in certain embodiments.

In some embodiments, client node 200 is part of CPE including, but are not limited to, a cable modem, a ONT, or a premises gateway. In some other embodiments, client node 200 is a wireless base station, infrastructure equipment (e.g. utility or transportation equipment), network equipment (e.g. an amplifier or a repeater), or a connection to another communication network.

The elements of client node 200 could be combined and/or divided without departing from the scope hereof. For example, memory 204 could include multiple elements, such as solid-state memory and a hard drive. As another example, processor 202 could including multiple co-processors. The elements of client node 200 may be commonly packaged, such as if client node 200 is a premises gateway. Alternately, two or more elements of client node 200 could be separately packaged or even disposed in different respective physical locations. For example, the elements of client node 200 could be distributed among multiple data centers.

Figure 3:
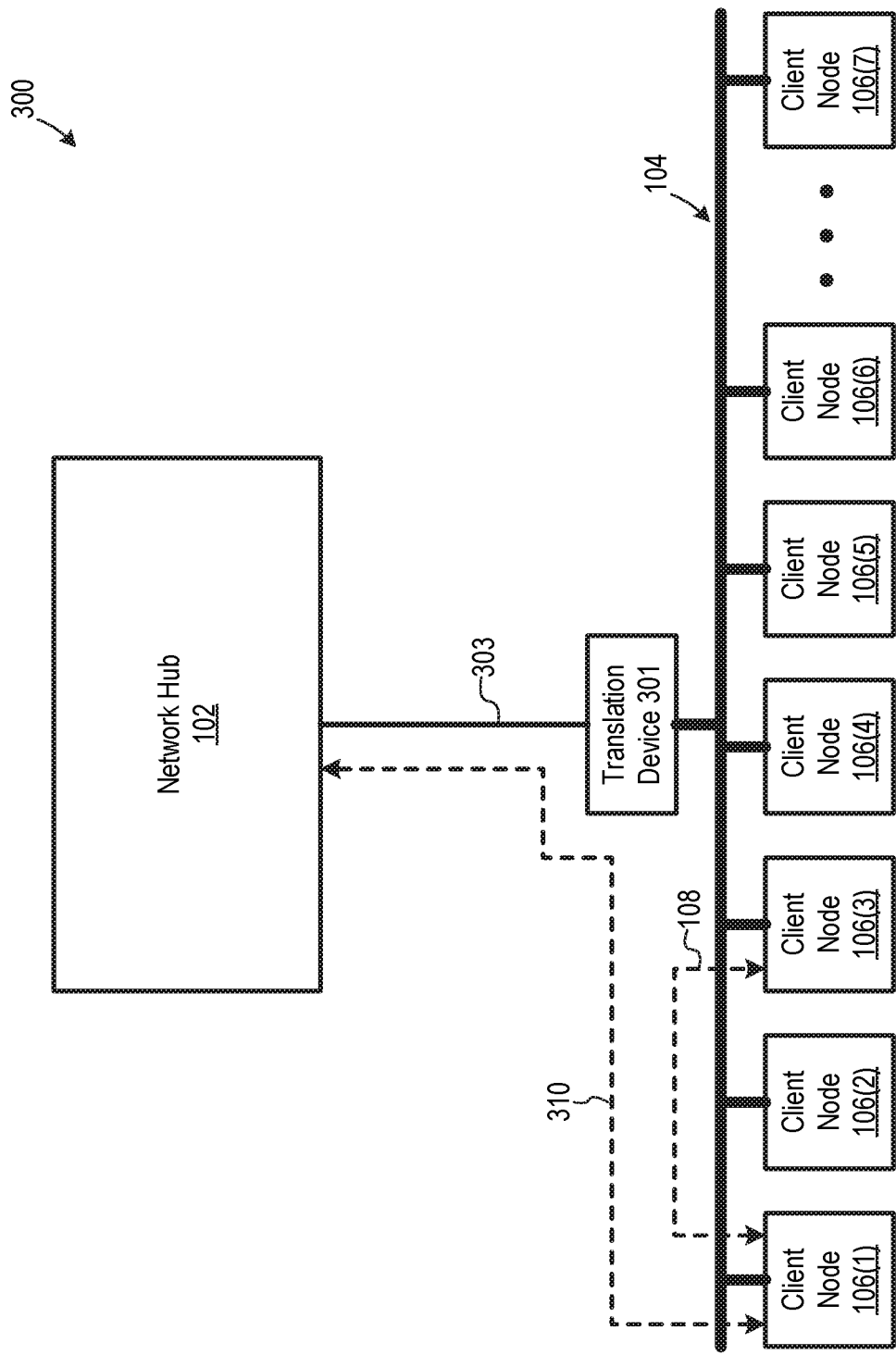
FIG. 3 is a schematic diagram of another communication network including a multi-purpose shared communication medium, according to an embodiment.

Referring again to FIG. 1, in some embodiments there are one or more intervening communication mediums between shared communication medium 104 and network hub 102. That is, in these embodiments, shared communication medium 104 is not directly connected to network hub 102. For example, FIG. 3 is a schematic diagram of a communication network 300, which is another embodiment of the new communication networks including a multi-purpose shared communication medium. Communication network 300 is similar to communication network 100 of FIG. 1, but communication network 300 further includes a translation device 301 and a backhaul communication medium 303. Backhaul communication medium 303 communicatively couples translation device 301 and network hub 102, and translation device 301 communicatively couples shared communication medium 104 and backhaul communication medium 303. Backhaul communication medium 303 is physically different from, and/or operates in a different manner than, shared communication medium 104. For example, in one embodiment, shared communication medium 104 includes a coaxial electrical cable, backhaul communication medium 303 includes an optical cable, and translation device 301 includes a fiber node. As another example, is another embodiment, shared communication medium 104 and backhaul communication medium 303 are each an optical cable, but backhaul communication medium 303 has a different physical configuration, or operates differently from, shared communication medium 104.

Remote data will travel through each of shared communication medium 104, translation device 301, and backhaul communication medium 303, in communication network 300. For example, FIG. 3 illustrates remote data 310 being transmitted between client node 106(1) and network hub 102 via shared communication medium 104, translation device 301, and backhaul communication medium 303.

Figure 4:
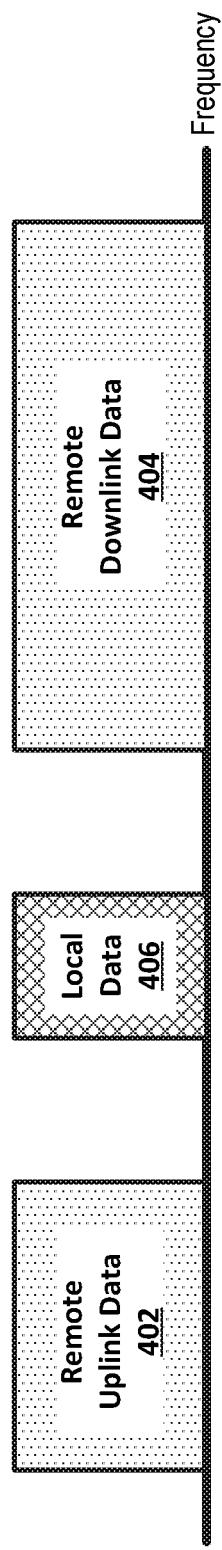
FIG. 4 is a graph illustrating one possible allocation of frequency bands in the communication networks of FIGS. 1 and 3, according to an embodiment.

In some embodiments, local data and remote data are transmitted on different respective frequency bands over shared communication medium 104, to enable simultaneous transmission of local data and remote data over shared communication medium 104. For example, FIG. 4 is a graph illustrating one possible allocation of frequency bands in communication networks 100 and 300. In the FIG. 4 embodiment, remote uplink data is transmitted via a lower-frequency band 402, remote downlink data is transmitted via a higher-frequency band 404, and local data is transmitted via a frequency band 406 between the two remote data frequency bands. Consequently, local data and remote data can be simultaneously transmitted over shared communication medium 104.

Figure 5:
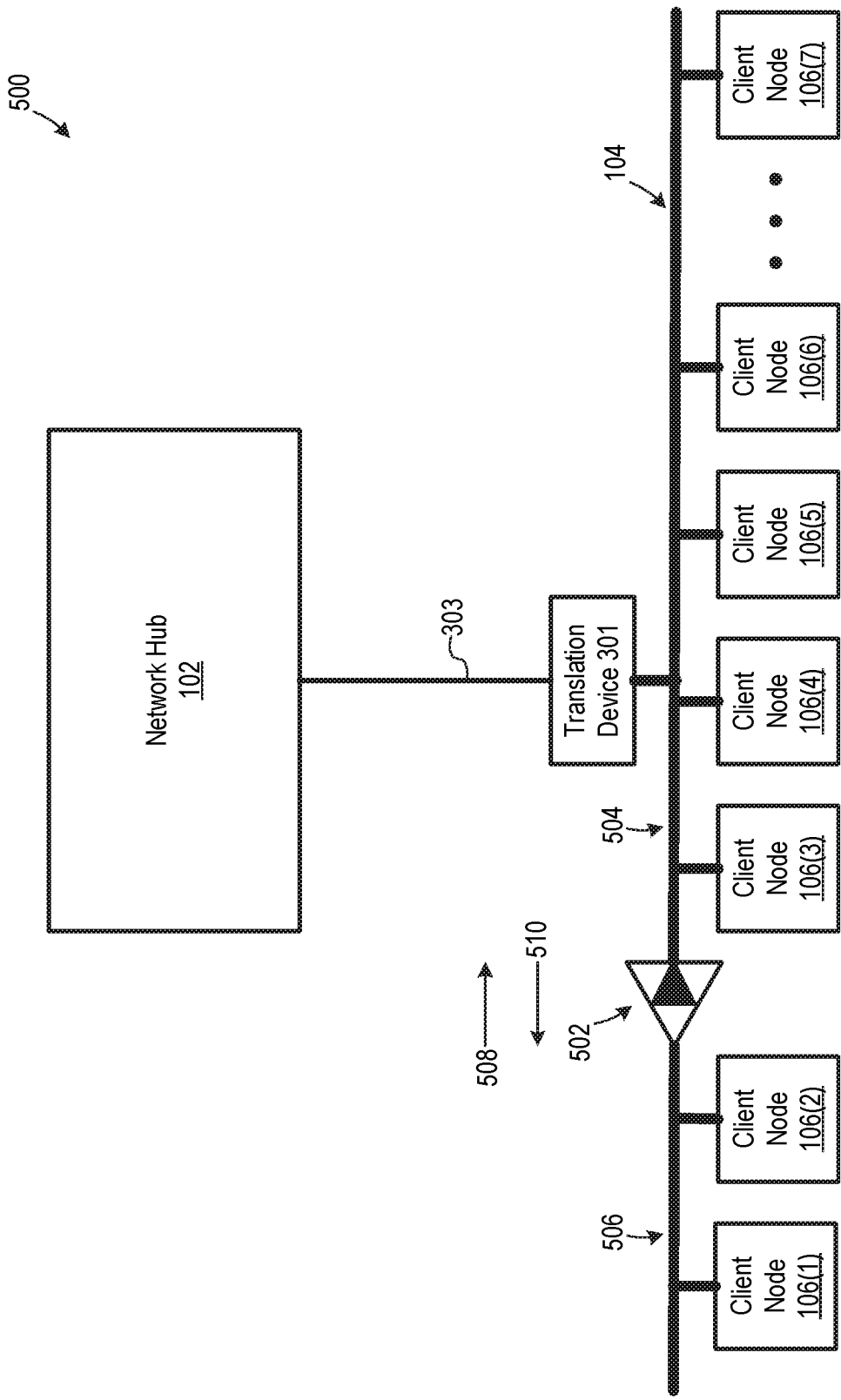
FIG. 5 is a schematic diagram of another communication network including a multi-purpose shared communication medium, according to an embodiment.

In some embodiments of communication networks 100 and 300, two or more segments of shared communication medium 104 are coupled via one or more signal processing devices, such as amplifiers or repeaters. In some embodiments, the signal processing devices only transmit signals within certain frequencies, such that local data signals will be blocked unless they are in a frequency range transmitted by the signal processing devices. For example, FIG. 5 is a schematic diagram of a communication network 500, which is another embodiment of the new communication networks including a multi-purpose shared communication medium. Communication network 500 is similar to communication network 300 of FIG. 3, but communication network 500 further includes an amplifier 502 communicatively coupling segments 504 and 506 of shared communication medium 104.

Figure 6:
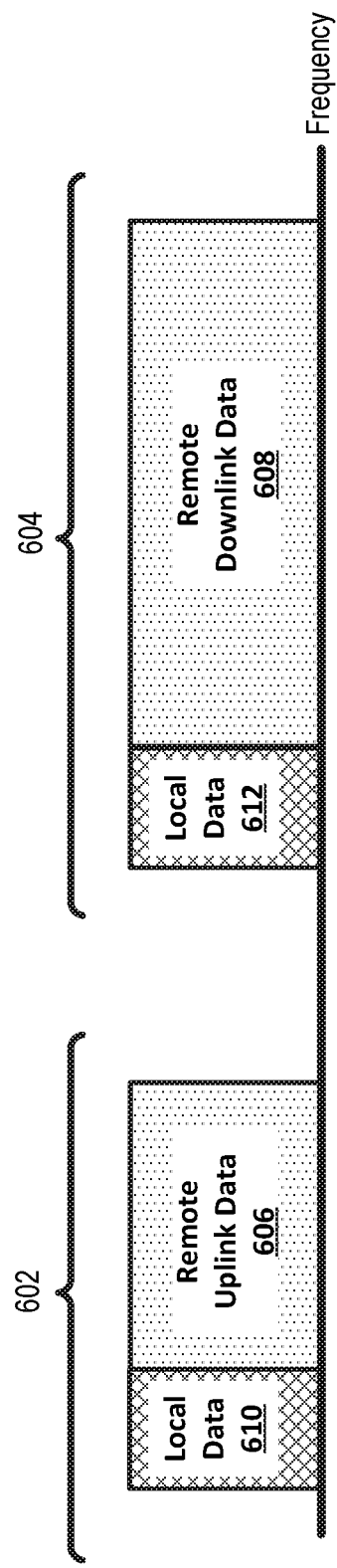
FIG. 6 is a graph illustrating one possible allocation of frequency bands in the communication network of FIG. 5, according to an embodiment.

FIG. 6 is a graph illustrating one possible allocation of frequency bands in communication network 500. Amplifier 502 is configured to transmit uplink and downlink signals in different frequency bands 602 and 604, respectively. Uplink signals travel through amplifier 502 in a direction 508, and downlink signals travel through amplifier 502 in a direction 510, as illustrated in FIG. 5. Accordingly, remote uplink data is transmitted via a lower-frequency band 606 within amplifier uplink frequency band 602, and remote downlink data is transmitted via a higher-frequency band 608 within downlink frequency band 604, as illustrated in FIG. 6. Local data is additionally split into two different frequency bands to enable bi-directional transmission of local data signals through amplifier 502. Specifically, local uplink data is transmitted via a frequency band 610 within amplifier uplink frequency band 602, and local downlink data is transmitted via a frequency band 612 within downlink frequency band 604.

The ability of communication networks 100, 300, and 500 to transmit local data via shared communication medium 104 may enable significant improvements in wireless communication network performance and wireless communication network scalability. In particular, significant data is transmitted through a network hub in the form of a packet core, in a conventional communication network supporting wireless communication. For example, in a conventional LTE wireless communication system, user plane data is transmitted between a wireless base station and a Serving Gateway (S-GW) of a packet core, and control plane data is transmitted between the wireless base station and a Mobility Management Entity (MME) of the packet core. As another example, in a conventional 5G wireless communication network, user plane data is transmitted between a wireless base station and a User Plane Function (UPF) of a packet core, and control plane data is transmitted between the wireless base station and an Access and Management Mobility Function (AMF) of the packet core. Additionally, there may be significant data transmission between wireless base stations, which must flow through a network hub in conventional communication networks. For example, wireless base stations in a LTE wireless communication system may communicate with each other according to an X2 interface, such as to coordinate user equipment (UE) handoff and/or to prevent interference between neighboring wireless base stations.

Additionally, the emerging deployment of multiple small cells is anticipated to place even greater loads on communication networks. In particular, not only must control plane and user plane data be transmitted between each small cell and a packet core, densification of wireless base stations from small cell deployment is anticipated to markedly increase handoff of UE among wireless base stations, which will itself further increase control plane data traffic, because significant control plane data must between transmitted to enable UE handoffs. Indeed, Applicant has estimated that small cells may generate ten to twenty times the amount of control plane data than macro cells covering the same geographic area. Furthermore, anticipated large increase in UE, such as from growth in Internet of Things (IoT) devices, is expected to further increase amount of wireless communication data flowing through communication networks. Accordingly, conventional communication networks may have difficulty in handling communication requirements of future applications due to the large amount of data that must flow through a network hub. Additionally, the requirement that all data flow through a network hub in conventional communication networks may cause difficulty in scaling wireless communication networks, such as to support additional wireless base stations and/or additional UE.

Applicant has determined, however, that these problems can potentially be at least partially overcome by hosting wireless communication network resources in client nodes 106, instead of in network hub 102. The ability of communication networks 100, 300, and 500 to transmit local data advantageously enables direct communication between wireless base stations and wireless network resources using shared communication medium 104, thereby reducing the need for wireless base stations to communicate with network hub 102. Such use of shared communication medium 104 for data transmission between wireless communication resources promotes by high performance by minimizing latency in the data transmission, as data transmission via shared communication medium 104 is typically low-latency, as discussed above. Furthermore, transmission of wireless communication data solely via shared communication medium 104 reduces load on communication media connected to network hub 102, thereby promoting overall communication network performance. Furthermore, the ability to host wireless network resources at client nodes 106 enables the wireless network resources to be distributed, thereby promoting wireless communication network scalability.

Figure 7:
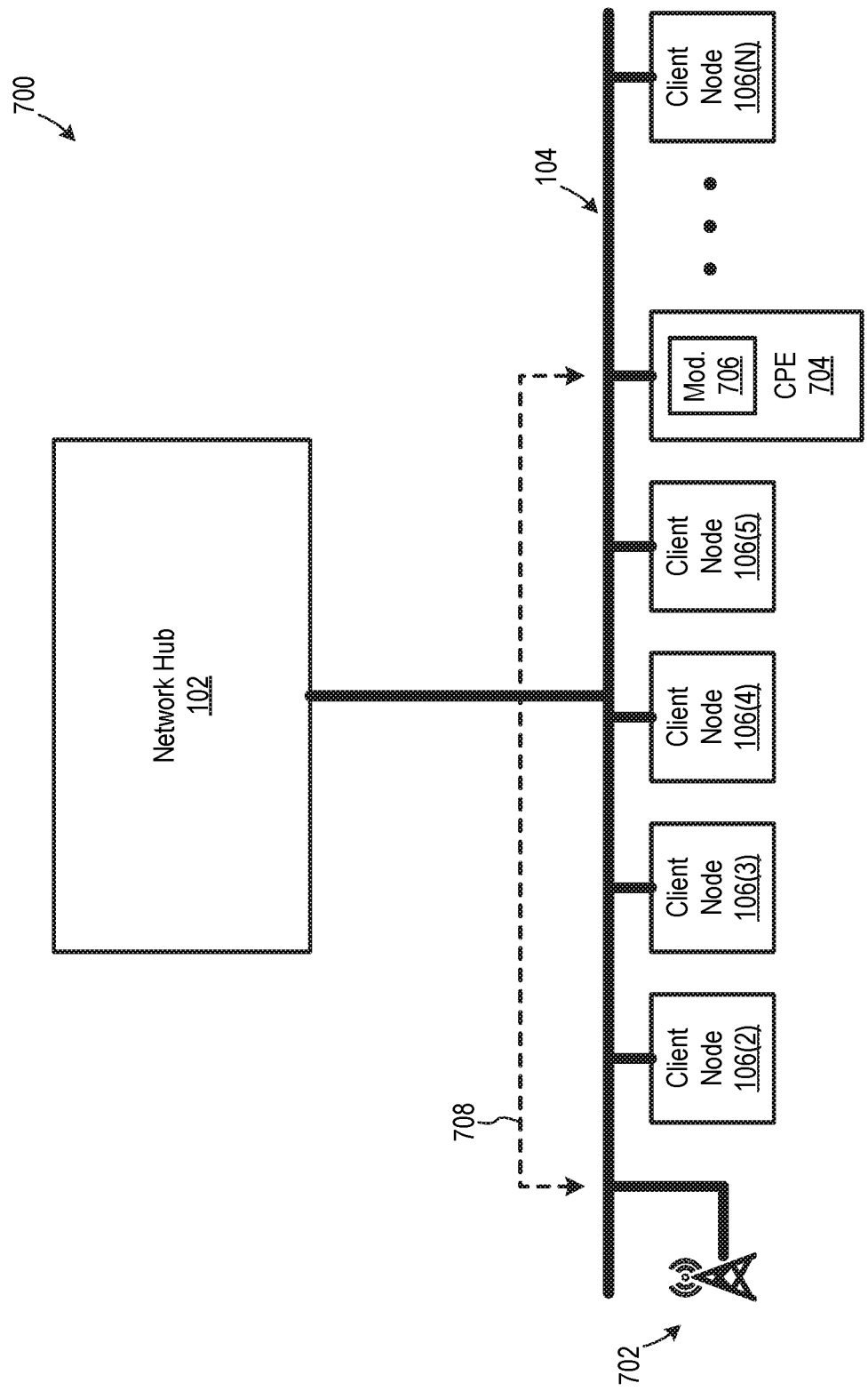
FIG. 7 is a schematic diagram of a communication network including a multi-purpose shared communication medium where a client node hosts a wireless communication network control module, according to an embodiment.

For example, FIG. 7 is a schematic diagram of a communication network 700, which is another embodiment of the new communication networks including a multi-purpose shared communication medium. Communication network 700 is similar to communication network 100 of FIG. 1 but with (a) client node 106(1) embodied by a wireless base station 702 and (b) client node 106(6) embodied by CPE 704. In some embodiments, wireless base station 702 is a LTE wireless base station, 5G NR wireless base station, a 6G wireless base station, an unlicensed radio spectrum wireless base station (e.g. a Wi-Fi or unlicensed NR), or extensions and/or variations thereof. Wireless base station 702 could also be part of a distributed wireless access point, such as a particular antenna/transceiver of the distributed wireless access point. CPE 704 hosts a wireless communication network control module 706. In some embodiments, CPE 704 is an embodiment of client node 200 of FIG. 2 where wireless communication network control module 706 is an embodiment of network resource 214.

Wireless communication network control module 706 supports wireless base stations, e.g. wireless base station 702, communicatively coupled to shared communication medium 104. In some embodiments, wireless communication network control module 706 implements one or more elements of a wireless communication network packet core, e.g. a LTE, 5G, or 6G packet core, which may advantageously reduce, or even eliminate, the need for wireless base station 702 to communicate with network hub 102. Instead, wireless base station 702 may directly communicate with wireless communication network control module 706 via local data 708 using shared communication medium 104.

In some embodiments, communication network 700 is configured to instantiate and terminate wireless communication network control module 706 in CPE 704 on demand, such as due to a change in operating conditions in communication network 700. For example, communication network 700 may instantiate wireless communication network control module 706 in response to an increase in load on wireless base station 702, to prevent excessive data flow between wireless base station 702 and network hub 102 resulting from the increased load on wireless base station 702. As another example, communication network 700 may terminate wireless communication network control module 706 in CPE 704 in response to a decrease in load on wireless base station 702. Accordingly, in particular embodiments, communication network 700 is configured to instantiate and terminate wireless communication network control modules to optimize operation of communication network 700. In particular embodiments, network hub 102 controls instantiating and termination of network resources in client nodes 106/200/702/704, while in some other embodiments, an external controller (not shown) controls instantiation and termination of network resources in client nodes 106/200/702/704.

Figure 8:
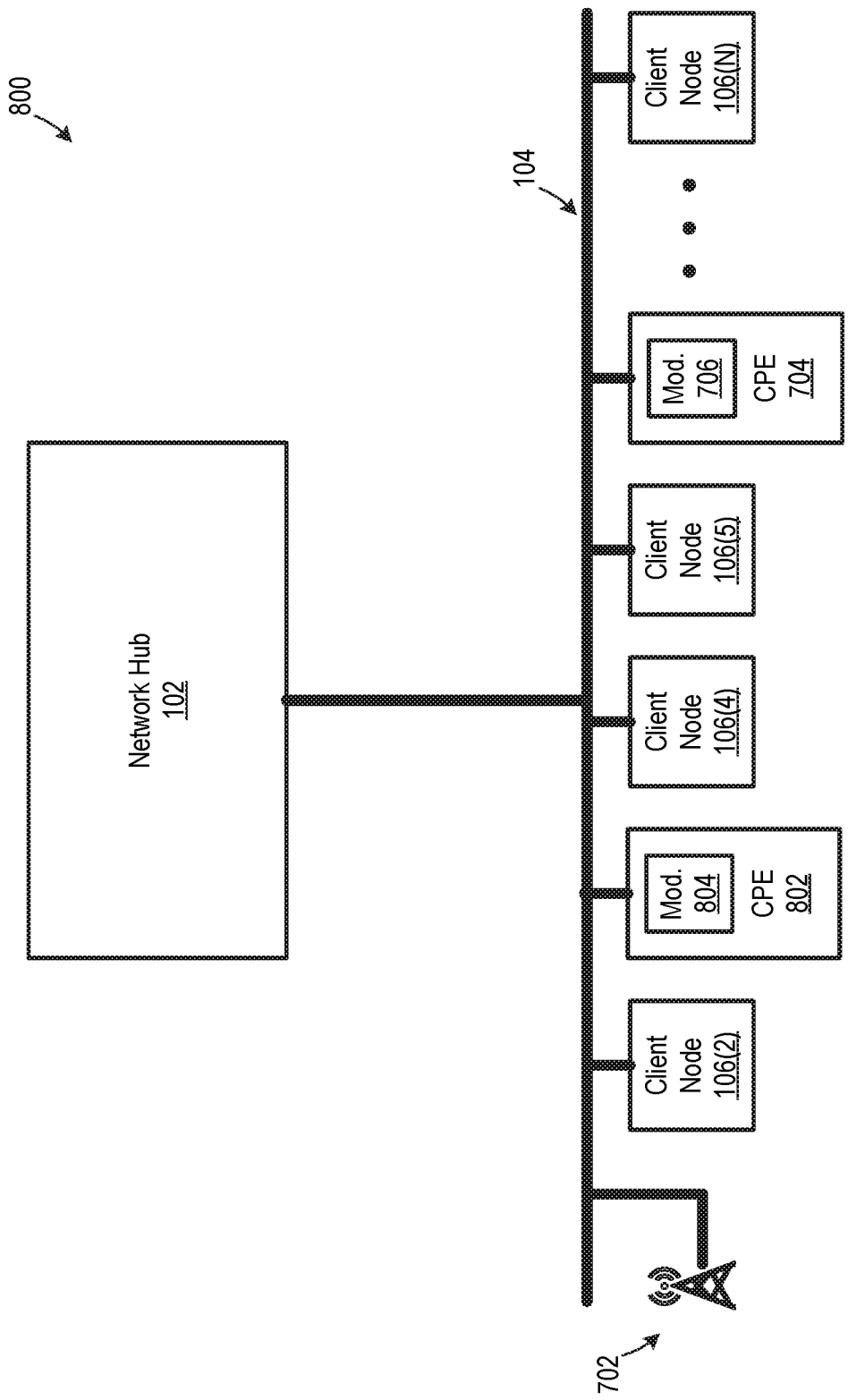
FIG. 8 is a schematic diagram of a communication network including a multi-purpose shared communication medium where two client nodes host respective wireless communication network control modules, according to an embodiment.

The communication systems disclosed herein are not limited to hosting network resource in a single client node. For example, FIG. 8 is a schematic diagram of a communication network 800, which is another embodiment of the new communication networks including a multi-purpose shared communication medium. Communication network 800 is similar to communication network 700 of FIG. 7 but with client node 106(3) embodied by CPE 802. CPE 802 hosts a wireless communication network control module 804. In some embodiments, CPE 802 is an embodiment of client node 200 of FIG. 2 where wireless communication network control module 804 is an embodiment of network resource 214. In certain embodiments, wireless communication network control module 706 and wireless communication network control module 804 are different respective elements of a wireless communication network packet core. Communication network 800 could include additional network functions hosted by client nodes 106/200/702/704/802 without departing from the scope hereof. Additionally, a given client node 106/200/702/704/802 could host multiple network functions.

In some embodiments, each of wireless communication network control modules 706 and 804 is one or more of a LTE MME, a LTE S-GW, a Home Subscriber Server HSS, a LTE PDN Gateway (P-GW), a LTE Policy Control and Charging Rules Function (PCRF), a 5G UPF, a 5G AMF, a 5G Authentication Server Function (AUSF), a 5G Session Management Function (SMF), a 5G Application Function (AF), a 5G Unified Data Function (UDM), and a 5G Policy control function (PCF). However, wireless communication network control modules 706 and 804 are not limited to these example network resources.

Figure 9:
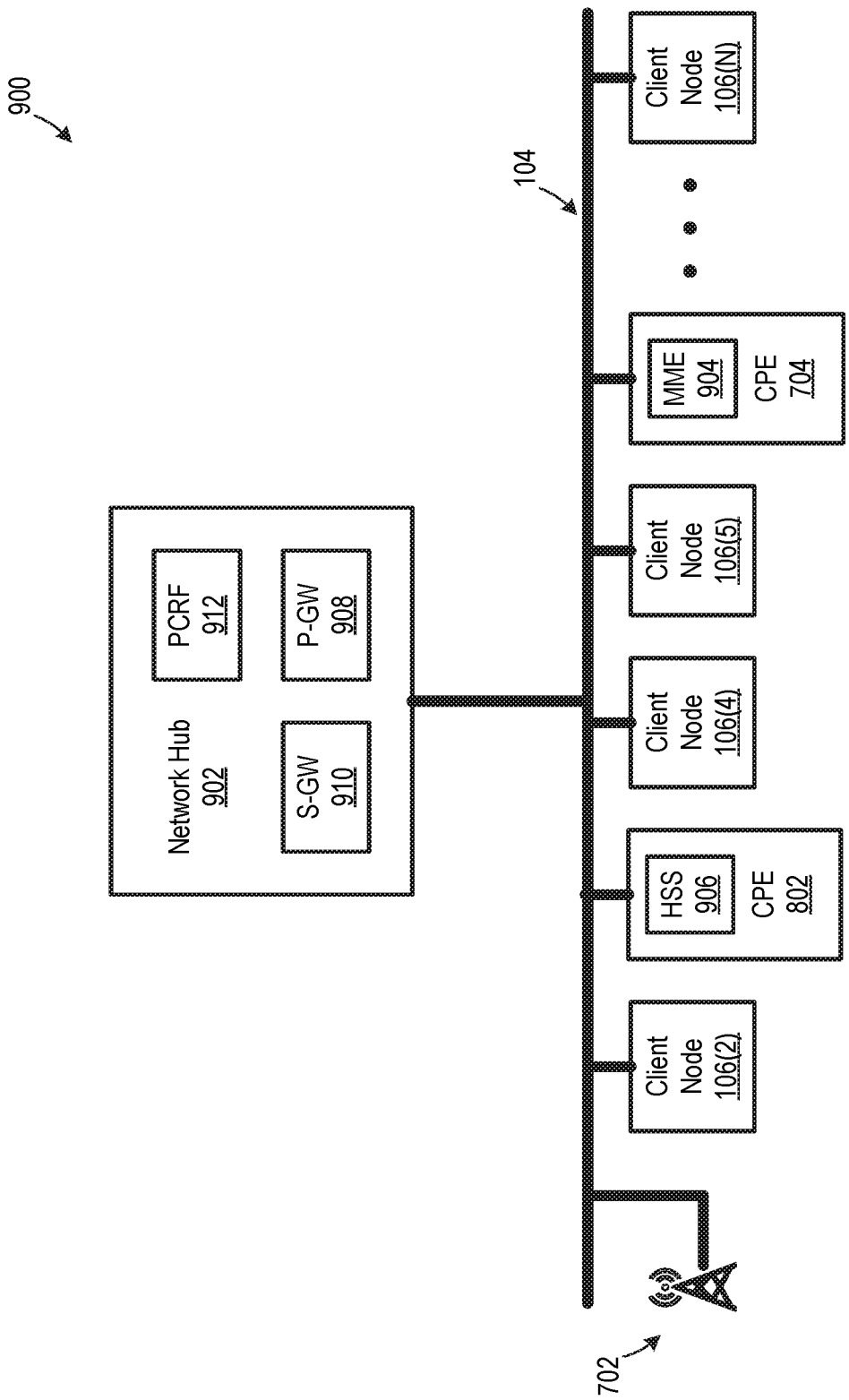
FIG. 9 is a schematic diagram of a communication network including a multi-purpose shared communication medium where two client nodes host respective elements of a long-term evolution packet core, according to an embodiment.
Figure 10:
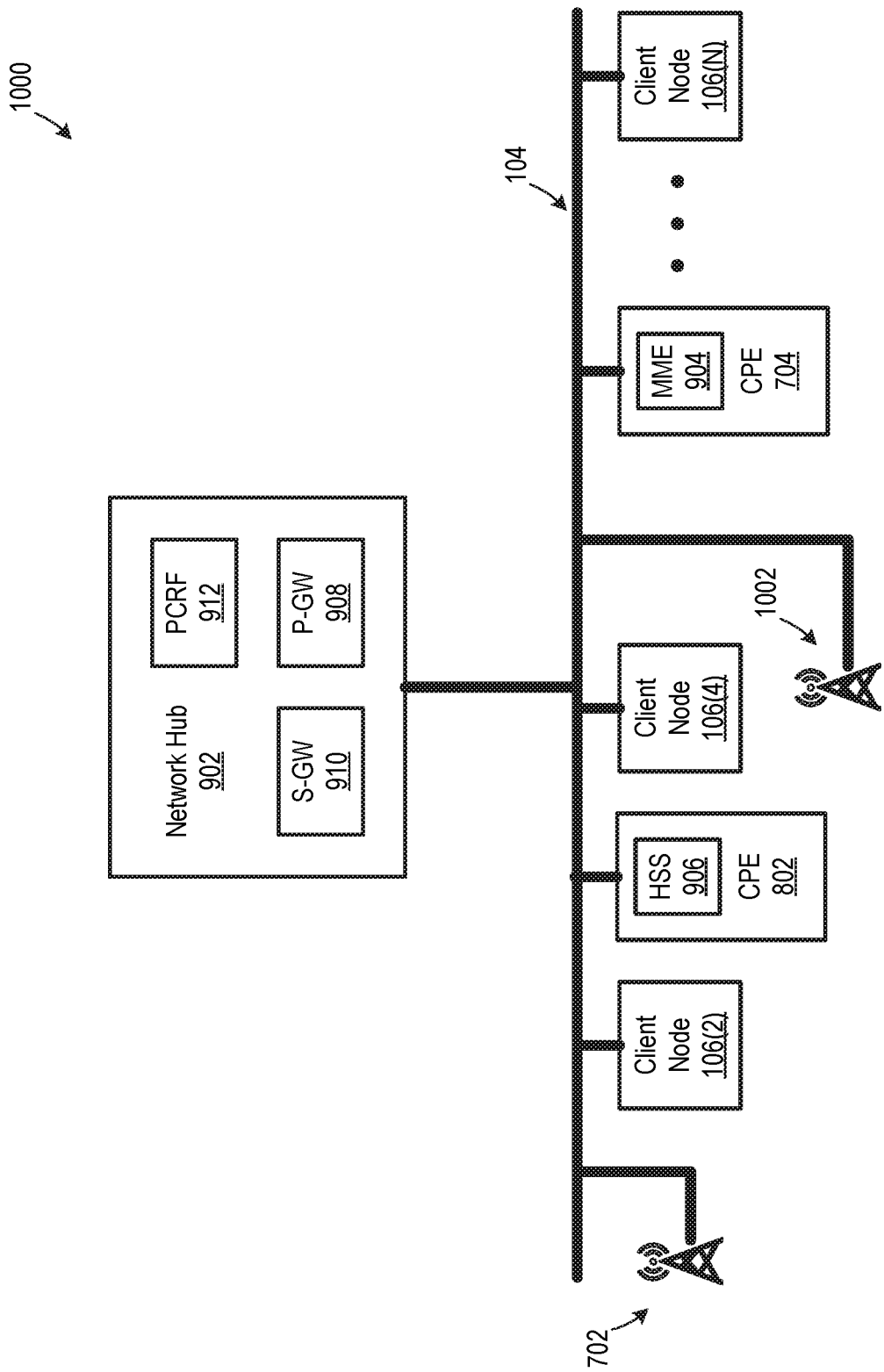
FIG. 10 is a schematic diagram of another communication network including a multi-purpose shared communication medium where two client nodes host respective elements of a long-term evolution packet core, according to an embodiment.
Figure 11:
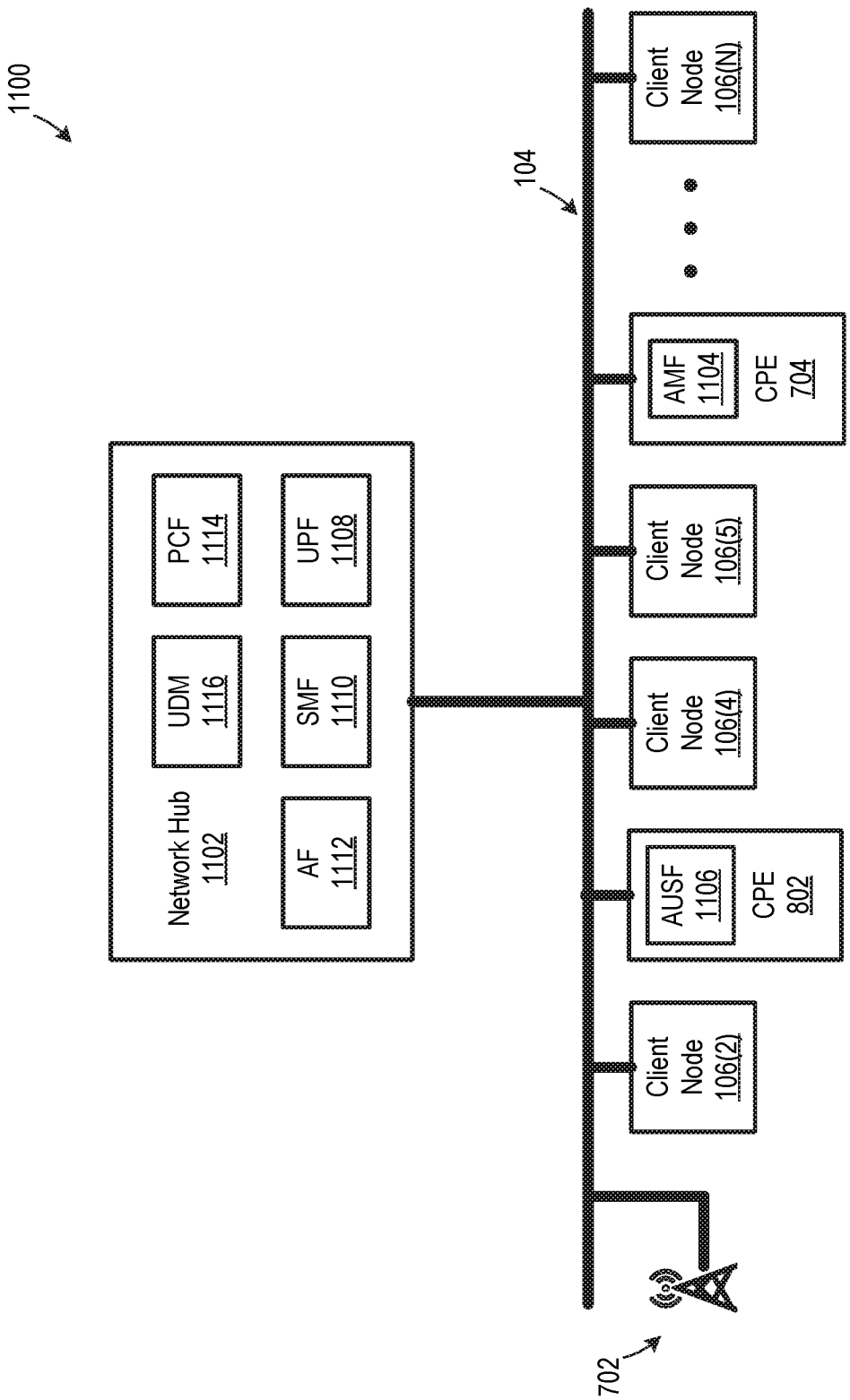
FIG. 11 is a schematic diagram of a communication network including a multi-purpose shared communication medium where two client nodes host respective elements of a fifth generation, new radio packet core, according to an embodiment.

Discussed below with respect to FIGS. 9 and 10 are examples of communication network 800 in LTE applications, and discussed below with respect to FIG. 11 is an example of communication network 800 in a 5G application. It should be appreciated, however, that communication network 800 is not limited to these example embodiments.

FIG. 9 is a schematic diagram of a communication network 900, which is an embodiment of communication network 800 where CPE 704 and CPE 802 host a MME 904 and a HSS 906, respectively. Additionally, network hub 102 is embodied as network hub 902 in FIG. 9, where network hub 902 includes a P-GW 908, a S-GW 910, and a PCRF 912. Hosting of MME 904 and HSS 906 by CPE 704 and 802, respectively, advantageously enables control plane data between wireless base station 702, MME 904, and HSS 906 to be routed as local data on shared communication medium 104. Such transmission of control plane data as local data eliminates latency associated with the control plane data traveling to network hub 902, which may be distant from wireless base station 102. Additionally, transmission of control plane data as local data helps reduce load on communication media connected to network hub 902. User plane data, however, flows between wireless base station 702 and S-GW 910 of network hub 902.

Communication network 900 could be modified so that additional, fewer, or different LTE packet core elements are hosted by client nodes. For example, in an alternate embodiment, HSS 906 is incorporated in network hub 902 instead of being hosted by CPE 802. As another example, in another alternate embodiment, S-GW 910 is hosted by CPE 802 in addition to, or in place of, HSS 906. As yet another example, in another alternate embodiment, S-GW 910 is hosted by client node 106(4), such that each of MME 904, HSS 906, and S-GW 910 are hosted by a respective client node on shared communication medium 104.

FIG. 10 is a schematic diagram of a communication network 1000, which is another embodiment of the new communication networks including a multi-purpose shared communication medium. Communication network 1000 is similar to communication network 800 of FIG. 8 but with client node 106(5) embodied by a wireless base station 1002.

Shared communication medium 104 enables direct communication between wireless base stations 702 and 1002 by transfer of local data, e.g. using a LTE X2 interface, such as for coordinating UE handoff, for preventing interference between wireless base stations 702 and 1002, and/or for beam forming by wireless base stations 702 and 1002. If either of wireless base stations 702 and 1002 needs to communicate with a wireless base station (not shown) that is not a client node of shared communication medium 104, such communication would travel through network hub 902, either via a LTE S1 or a LTE X2 interface. In some embodiments, wireless base stations 702 and 1002 are respective antennas/transceivers of a distributed wireless access point.

FIG. 11 is a schematic diagram of a communication network 1100, which is an embodiment of communication network 800 where CPE 704 and 802 host an AMF 1104 and a AUSF 1106, respectively. Additionally, network hub 102 is embodied as network hub 1102 in FIG. 11, where network hub 1102 includes a UPF 1108, a SMF 1110, an AF 1112, a PCF 1114, and a UDM 1116. Hosting of AMF 1104 and AUSF 1106 by CPE 704 and 802, respectively, advantageously enables control plane data between wireless base station 702 and AMF 1104 and AUSF 1106 to be routed as local data on shared communication medium 104, thereby eliminating latency associated with this control plane data traveling to network hub 1102 and helping reduce load on communication media connected to network hub 1102. User plane data, however flows between wireless base station 702 and UPF 1108 of network hub 1102.

Communication network 1100 could be modified so that additional, fewer, or different 5G packet core elements hosted by client nodes. For example, in an alternate embodiment, AUSF 1106 is incorporated in network hub 1102 instead of being hosted by CPE 802. As another example, in another alternate embodiment, UPF 1108 is hosted by CPE 802 in addition to, or in place of, AUSF 1106. As yet another example, in another alternate embodiment, UPF 1108 is hosted by client node 106(4), such that each of AMF 1104, AUSF 1106, and UPF 1108 are hosted by a respective client node on shared communication medium 104.

The ability of communication networks 100, 300, and 500 to transmit local data via shared communication medium 104 may also enable significant improvements in content distribution. In particular, content is conventionally delivered to client nodes via a network hub from one or more content servers upstream from the network hub. Such content delivery method places significant load on the network hub and communication media connected to the network hub. Furthermore, multiple data streams of the same content may be transmitted to different client nodes, resulting in inefficient use of communication media, when delivering content using conventional techniques.

Applicant has determined, however, that these problems can potentially be at least partially overcome by hosting content servers in client nodes 106, instead of upstream from network hub 102. The ability of communication networks 100, 300, and 500 to transmit local data advantageously enables direct communication between content servers and content consumers at client nodes 106, thereby reducing the need for client nodes 106 to receive content via network hub 102. Such use of shared communication medium 104 to transmit content locally stored in content servers hosted by client nodes 106 promotes by high performance by minimizing latency in the data transmission between content servers and content consumers, as data transmission via shared communication medium 104 is typically low-latency, as discussed above. Furthermore, transmission of content data solely via shared communication medium 104 reduces load on communication media connected to network hub 102, thereby promoting overall communication network performance. Furthermore, the ability to host content servers at client nodes 106 enables content storage to be distributed, thereby promoting scalability in content storage.

Figure 12:
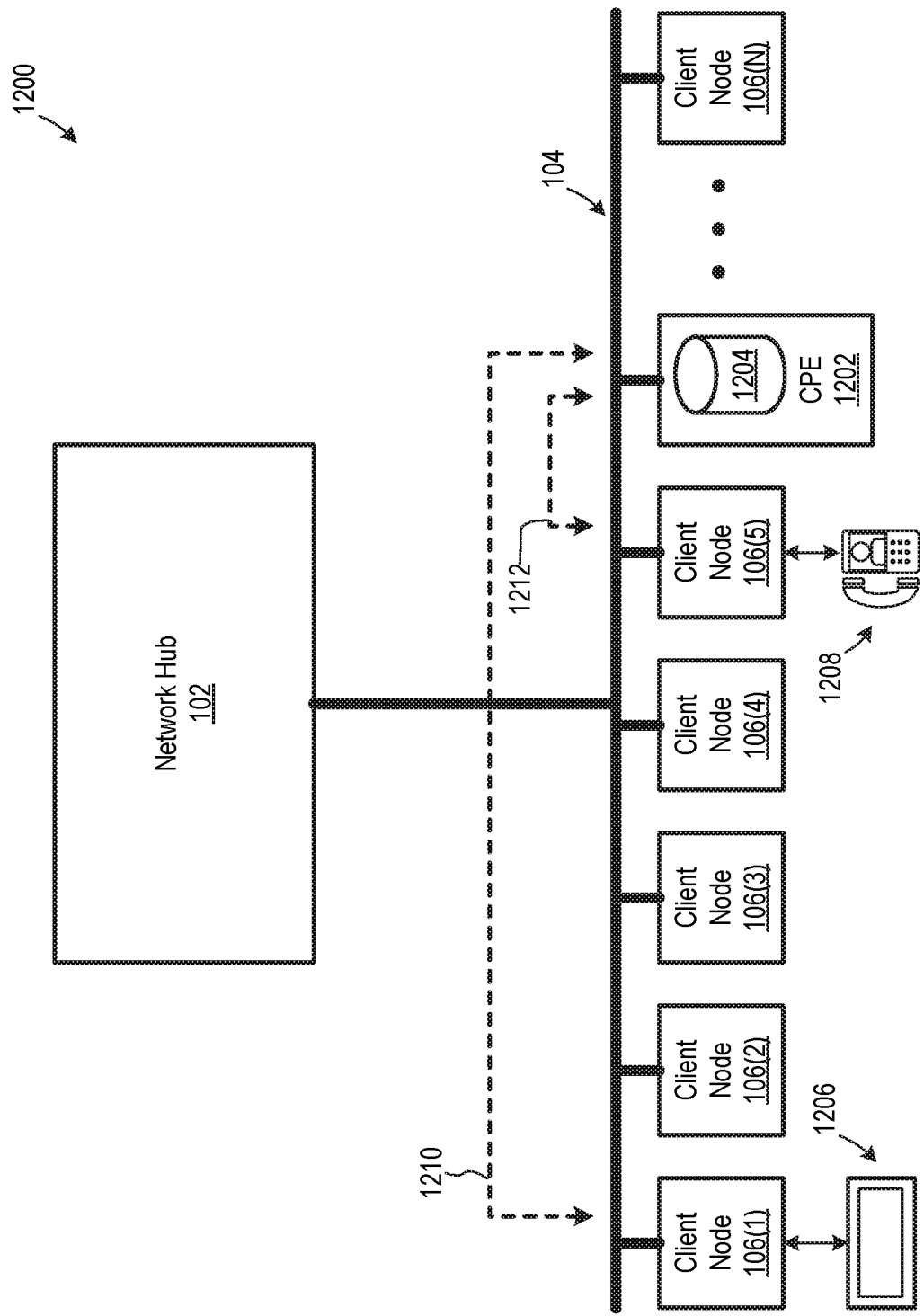
FIG. 12 is a schematic diagram of a communication network including a multi-purpose shared communication medium where a client node hosts a content server, according to an embodiment.

For example, FIG. 12 is a schematic diagram of a communication network 1200, which is another embodiment of the new communication networks including a multi-purpose shared communication medium. Communication network 1200 is similar to communication network 100 of FIG. 1 but with client node 106(6) embodied by CPE 1202 hosting a content server 1204. Additionally, communication network 1200 includes (a) a video display 1206 communicatively coupled to client node 106(1) and (b) a video telephone 1208 communicatively coupled to client node 106(5). Some possible examples of content stored by content server 1204 include, but are not limited to, video data, audio data, virtual reality data, and augmented reality data. In some embodiments, content server 1204 is an embodiment of client node 200 of FIG. 2 where content server 1204 is an embodiment of network resource 214.

Content server 1204 provides content to client nodes 106 via shared communication medium 104. Consequently, client nodes 106 can access content data stored in content server 1204 as local data, and client nodes 106 can therefore access the content stored in content server 1204 without accessing network hub 102. For example, FIG. 12 illustrates client node 106(1) accessing content from content server 1204 as local data 1210 for display on video display 1206, and FIG. 12 further illustrates client node 106(5) accessing content from content server 1204 as local data 1212 for display on video telephone 1208. Transmitting content data as local data promotes high performance because shared communication medium 104 typically has low-latency, as discussed above. Additionally, hosting of content server in CPE 1202 eliminates the need for associated content data to flow to network hub 1202, thereby helping conserve bandwidth of communication media connected to network hub 102.

In some embodiments, communication network 1200 is configured to instantiate and terminate content server 1204 in CPE 1202 on demand, such as due to a change in operating conditions in communication network 1200. For example, communication network 1200 may instantiate content server 1204 in response to a request for content from a client node 106. As another example, communication network 1200 may terminate content server 1204 in CPE 1202 in response to a client node 106 no longer requesting content. Accordingly, in particular embodiments, communication network 1200 is configured to instantiate and terminate content servers to optimize operation of communication network 1200. In particular embodiments, network hub 102 controls instantiating and termination of client servers in client nodes 106/200/1202, while in some other embodiments, an external controller (not shown) controls instantiation and termination of network resources in client nodes 106/200/1202.

Figure 13:
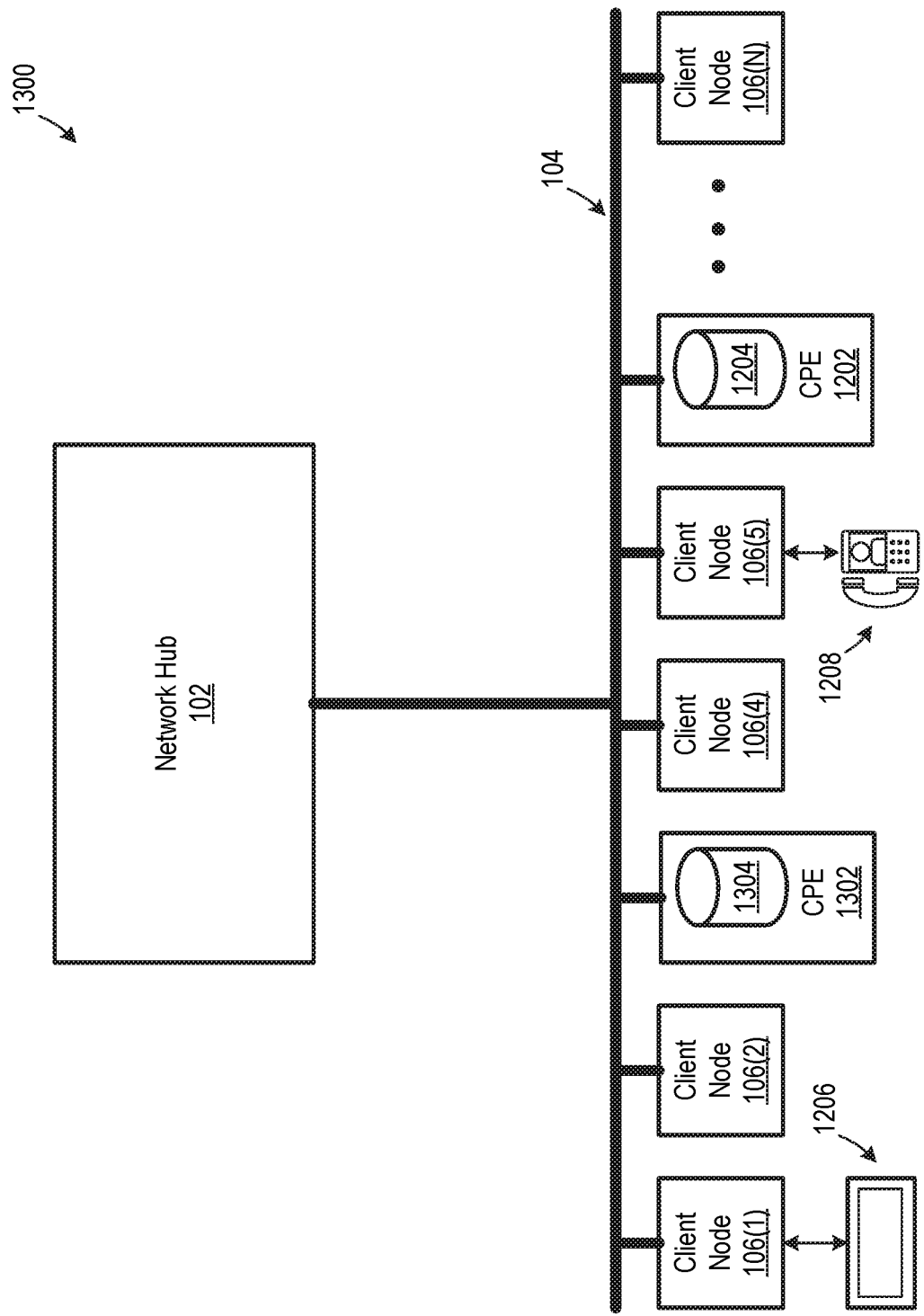
FIG. 13 is a schematic diagram of a communication network including a multi-purpose shared communication medium where two client nodes host respective content servers, according to an embodiment.

The communication systems disclosed herein are not limited to hosting a content server in a single client node. For example, FIG. 13 is a schematic diagram of a communication network 1300, which is another embodiment of the new communication networks including a multi-purpose shared communication medium. Communication network 1300 is similar to communication network 1200 of FIG. 12 but with client node 106(3) embodied by CPE 1302. CPE 1302 hosts a content server 1304. In some embodiments, content server 1304 is an embodiment of client node 200 of FIG. 2 where content server 1304 is an embodiment of network resource 214. Communication network 1300 could include additional network resources hosted by client nodes 106/200/1202/1302 without departing from the scope hereof. Additionally, a given client node 106/200/1202/1302 could host multiple network resources.

Client nodes 106 could host additional or alternative network resources. For examples, in some embodiments, client nodes 106 host network resources such as edge computing services, virtual reality services, and/or augmented reality services.

Figure 14:
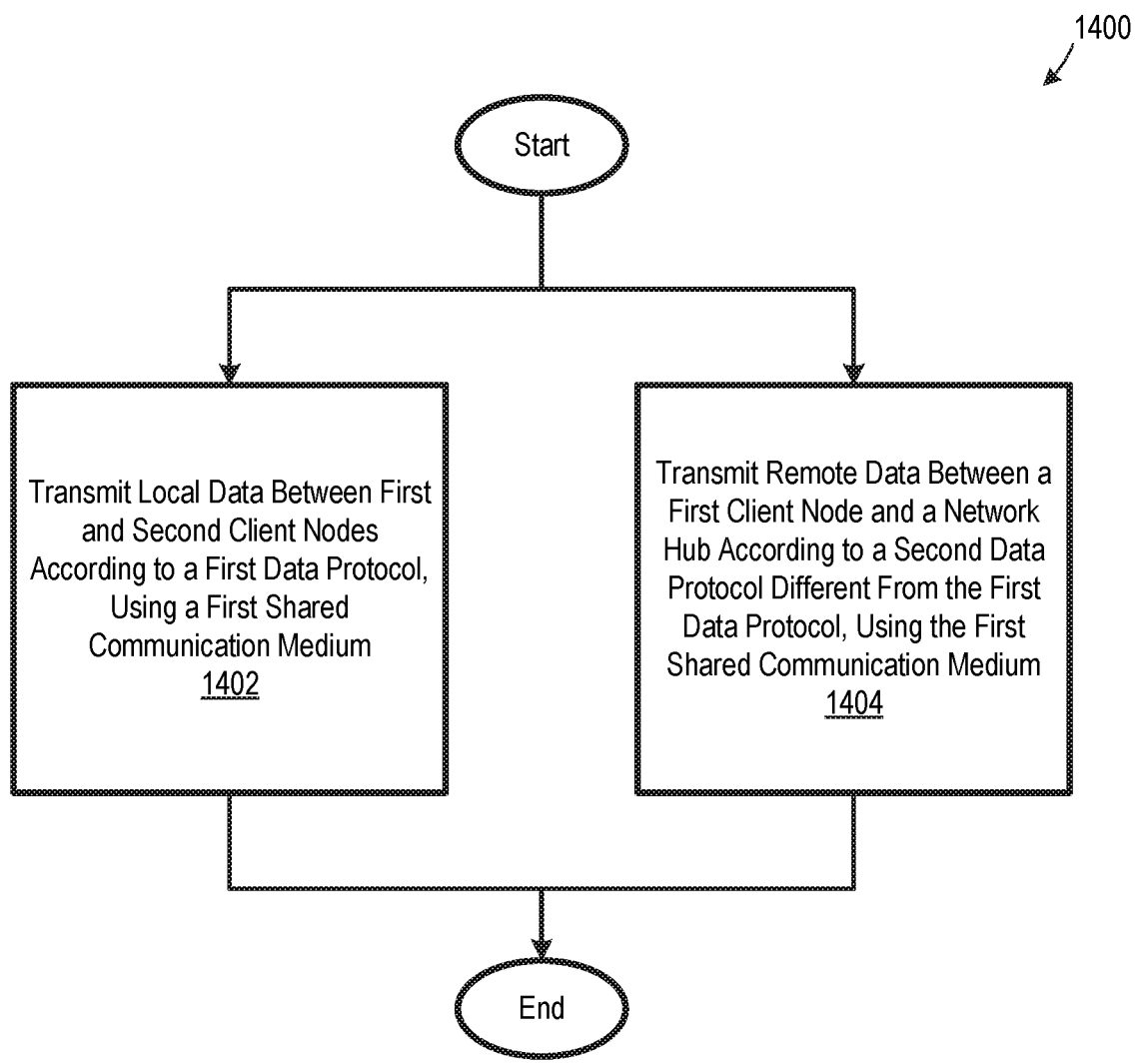
FIG. 14 is a flow chart illustrating a method for transmitting data in a communication network including a shared communication medium, according to an embodiment.

FIG. 14 is a flow chart illustrating a method 1400 for transmitting data in a communication network including a shared communication medium. In a block 1402, local data is transmitted between a first client node and a second client node according to a first data protocol, using a first shared communication medium. In one example of block 1402, local data 108 is transmitted between client nodes 106(1) and 106(3) according to a first data protocol, using shared communication medium 104 [FIG. 1]. In a block 1404, remote data is transmitted between the first client node and a network hub according to a second data protocol different from the first data protocol, using at least the first shared communication medium. In one example of block 1404, remote data 110 is transmitted between client node 106(1) and network hub 102 according to a second data protocol, using shared communication medium 104. Although FIG. 14 illustrates blocks 1402 and 1404 being executed in parallel, blocks 1402 and 1404 could be executed in series without departing from the scope hereof.

Figure 15:
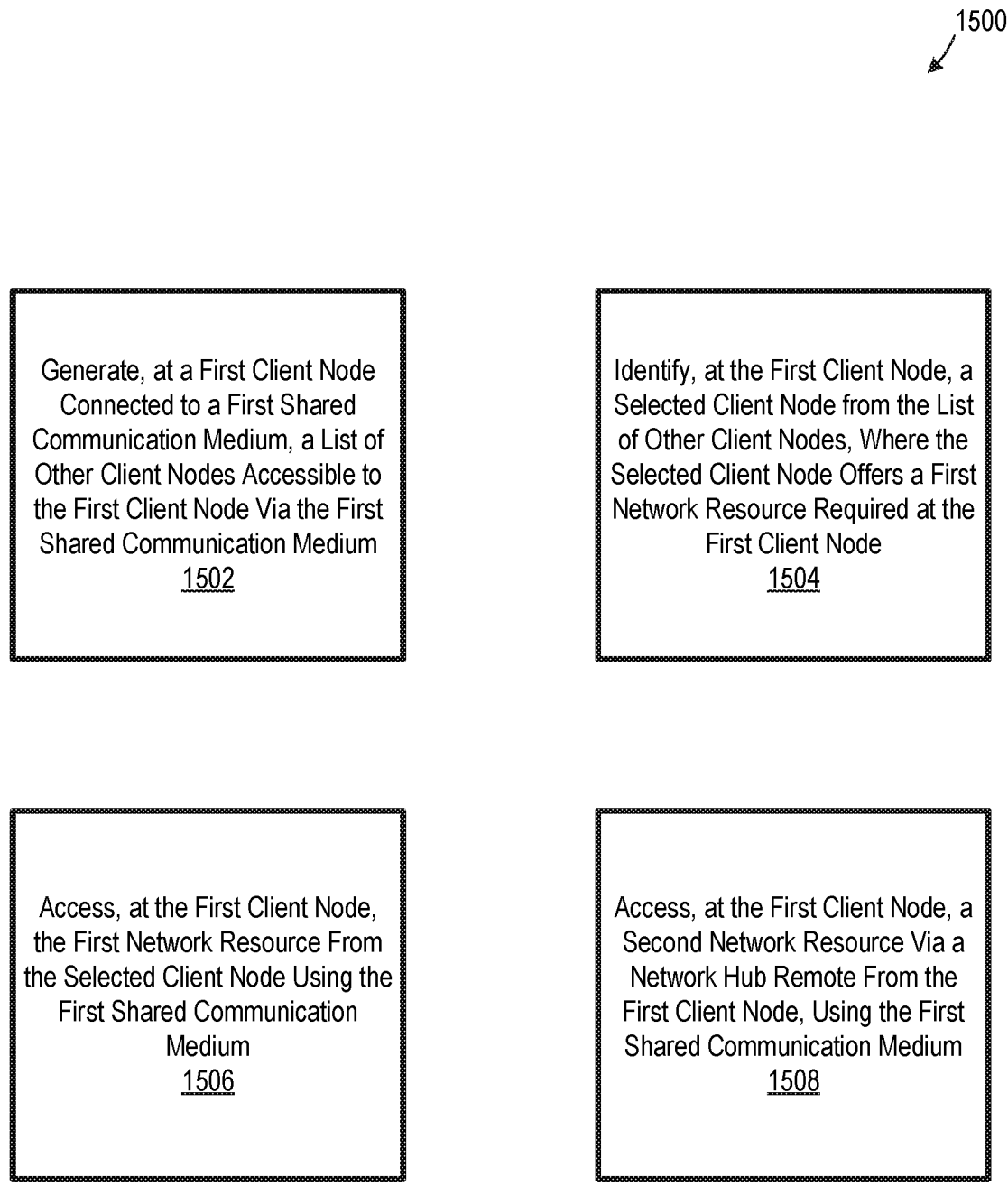
FIG. 15 is a block diagram illustrating a method for transmitting data in a communication network including a shared communication medium, according to an embodiment.

FIG. 15 is a block diagram illustrating a method 1500 for transmitting data in a communication network including a shared communication medium. In a block 1502, a list of other client nodes accessible to a first client node via a first shared communication medium is generated at the first client node, where the first client node is connected to the first shared communication medium. In one example of block 1502, client node 200 generates routing table 212 [FIG. 2]. In a block 1504, a selected client node is identified at the first client node from the list of other client nodes, where the selected client node offers a first network resource required at the first client node. In one example of block 1504, client node 106(5) is identified, at client node 200, as offering network resource A. In a block 1506, the first network resource is accessed at the first client node from the selected client node using the first shared communication medium. In one example of block 1506, network resource A is accessed at client node 200 from client node 106(5) using shared communication medium 104. In a block 1508, a second network resource is accessed at the first client node via a network hub remote from the first client node, using the shared communication medium. In one example of block 1508, client node 200 accesses a second network resource via network hub 102, using shared communication medium 104. The blocks of method 1500 could be executed in parallel and/or series.

Combinations of Features

Features described above may be combined in various ways without departing from the scope hereof. The following examples illustrate some possible combinations:

(A1) A method for transmitting data in a communication network including a shared communication medium may include (1) transmitting local data between a first client node and a second client node according to a first data protocol, using a first shared communication medium and (2) transmitting remote data between the first client node and a network hub according to a second data protocol different from the first data protocol, using at least the first shared communication medium.

(A2) The method denoted as (A1) may further include simultaneously (1) transmitting the local data between the first client node and the second client node via one or more first frequency bands using the first shared communication medium and (2) transmitting the remote data between the first client node and the network hub via one or more second frequency bands using at least the first shared communication medium, the one or more first frequency bands being different from the one or more second frequency bands.

(A3) Any one of the methods denoted as (A1) and (A2) may further include (1) determining that a network resource required at the first client node is available at the second client node and (2) in response to determining that the network resource is available at the second client node, accessing the network resource at the first client node from the second client node using the first shared communication medium.

(A4) Any one of the methods denoted as (A1) and (A2) may further include (1) determining that a network resource required at the first client node is not available to the first client node via another client node communicatively coupled to the first communication medium and (2) in response to determining that the network resource is not available to the first client node via another client node communicatively coupled to the first communication medium, accessing the network resource via the network hub.

(A5) In any one of the methods denoted as (A1) through (A4), the local data may include wireless communication network control data transmitted between a wireless base station at the first client node and a wireless communication network control module at the second client node.

(A6) The method denoted as (A5) may further include instantiating the wireless communication network control module in customer premises equipment at the second client node.

(A7) Any one of the methods denoted as (A5) and (A6) may further include instantiating the wireless communication network control module in the customer premises equipment in response to a change in operating conditions in the wireless communication network.

(A8) In any one of the methods denoted as (A5) through (A7), the wireless communication network control module may include at least one of a Mobility Management Entity (MME), a Serving Gateway (S-GW), a Home Subscriber Server (HSS), a PDN Gateway (P-GW), a Policy Control and Charging Rules Function (PCRF), a User Plane Function (UPF), an Access Management Mobility Function (AMF), an Authentication Server Function (AUSF), a Session Management Function (SMF), an Application Function (AF), an Unified Data Function (UDM), and a Policy control function (PCF).

(A9) In any one of the methods denoted as (A1) through (A8), the local data may include content data from a content server at the second client node.

(A10) The method denoted as (A9) may further include instantiating the content server in customer premises equipment at the second client node.

(A11) The method denoted as (A10) may further include instantiating the content server in the customer premises equipment in response to a demand for the data by one or more client nodes communicatively coupled to the first communication medium.

(A12) Any one of the methods denoted as (A1) through (A11) may further include transmitting the remote data between the first client node and the network hub partially using a backhaul communication medium between the first shared communication medium and the network hub.

(A13) In any one of the methods denoted as (A1) through (A12), the first shared communication medium may include a coaxial electrical cable.

(A14) In any one of the methods denoted as (A1) through (A13), the first shared communication medium may include an optical cable.

(B1) A method for transmitting data in a communication network including a shared communication medium may include (1) generating, at a first client node connected to a first shared communication medium, a list of other client nodes accessible to the first client node via the first shared communication medium, (2) identifying, at the first client node, a selected client node from the list of other client nodes, where the selected client node offers a first network resource required at the first client node, (3) accessing, at the first client node, the first network resource from the selected client node using the first shared communication medium, and (4) accessing, at the first client node, a second network resource via a network hub remote from the first client node, using the first shared communication medium.

(B2) In the method denoted as (B1), the first network resource may be a wireless communication network control module in customer premises equipment at the selected client node.

(B3) In the method denoted as (B2), the wireless communication network control module may include at least one of a Mobility Management Entity (MME), a Serving Gateway (S-GW), a Home Subscriber Server (HSS), a PDN Gateway (P-GW), a Policy Control and Charging Rules Function (PCRF), a User Plane Function (UPF), an Access Management Mobility Function (AMF), an Authentication Server Function (AUSF), a Session Management Function (SMF), an Application Function (AF), an Unified Data Function (UDM), and a Policy control function (PCF).

(B4) In the method denoted as (B1), the first network resource may be a content server in customer premises equipment at the selected client node.

(B5) In any one of the methods denoted as (B1) through (B4), the first shared communication medium may include a coaxial electrical cable.

(B6) In any one of the methods denoted as (B1) through (B5), the first shared communication medium may include an optical cable.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for transmitting data in a communication network including a shared communication medium, comprising:
    transmitting local data between a first node and a second node according to a first data protocol, using a first shared communication medium including at least one of an electrical cable and an optical cable;
    transmitting remote data between the first node and a network hub according to a second data protocol different from the first data protocol, using at least the first shared communication medium;
    determining that a network resource required at the first node is not available to the first node via another node communicatively coupled to the first shared communication medium; and
    in response to determining that the network resource is not available to the first node via another node communicatively coupled to the first shared communication medium, accessing the network resource via the network hub.

2. The method of claim 1, further comprising simultaneously (a) transmitting the local data between the first node and the second node via one or more first frequency bands using the first shared communication medium and (b) transmitting the remote data between the first node and the network hub via one or more second frequency bands using at least the first shared communication medium, the one or more first frequency bands being different from the one or more second frequency bands.

3. A method for transmitting data in a communication network including a shared communication medium, comprising:
    transmitting local data between a first node and a second node according to a first data protocol, using a first shared communication medium including at least one of an electrical cable and an optical cable;
    transmitting remote data between the first node and a network hub according to a second data protocol different from the first data protocol, using at least the first shared communication medium;
    determining that a network resource required at the first node is available at the second node; and
    in response to determining that the network resource is available at the second node, accessing the network resource at the first node from the second node using the first shared communication medium.

4. A method for transmitting data in a communication network including a shared communication medium, comprising:
    transmitting local data between a first node and a second node according to a first data protocol, using a first shared communication medium including at least one of an electrical cable and an optical cable, the local data comprising wireless communication network control data transmitted between a wireless base station at the first node and a wireless communication network control module at the second node;
    transmitting remote data between the first node and a network hub according to a second data protocol different from the first data protocol, using at least the first shared communication medium; and
    instantiating the wireless communication network control module in customer premises equipment at the second node.

5. The method of claim 4, further comprising instantiating the wireless communication network control module in the customer premises equipment in response to a change in operating conditions in the wireless communication network.

6. The method of claim 4, wherein the wireless communication network control module comprises at least one of a Mobility Management Entity (MME), a Serving Gateway (S-GW), a Home Subscriber Server (HSS), a PDN Gateway (P-GW), a Policy Control and Charging Rules Function (PCRF), a User Plane Function (UPF), an Access Management Mobility Function (AMF), an Authentication Server Function (AUSF), a Session Management Function (SMF), an Application Function (AF), an Unified Data Function (UDM), and a Policy control function (PCF).

7. A method for transmitting data in a communication network including a shared communication medium, comprising
transmitting local data between a first node and a second node according to a first data protocol, using a first shared communication medium including at least one of an electrical cable and an optical cable, wherein the local data comprises content data from a content server at the second node;
transmitting remote data between the first node and a network hub according to a second data protocol different from the first data protocol, using at least the first shared communication medium;
instantiating the content server in customer premises equipment at the second node in response to a demand for the data by one or more nodes communicatively coupled to the first shared communication medium.

8. The method of claim 1, further comprising transmitting the remote data between the first node and the network hub using a backhaul communication medium between the first shared communication medium and the network hub.

9. The method of claim 1, wherein the first shared communication medium comprises a coaxial electrical cable.

10. A node for use in a communication network including a shared communication medium, comprising:
a first communication module configured to transmit local data between the node and an additional node according to a first data protocol, using a first shared communication medium including at least one of an electrical cable and an optical cable;
a second communication module configured to transmit remote data between the node and a network hub according to a second data protocol that is different from the first data protocol, using the first shared communication medium; and
a processor and a memory, wherein the processor is configured to execute instructions stored in the memory to:
determine that a network resource required at the node is not available via another node communicatively coupled to the first shared communication medium, and
in response to determining that the network resource is not available via another node communicatively coupled to the first shared communication medium, access the network resource via the network hub.

11. The node of claim 10, wherein the first and second communication modules are further respectively configured to (a) transmit the local data between the node and the additional node via one or more first frequency bands using the first shared communication medium and (b) transmit the remote data between the node and the network hub via one or more second frequency bands using at least the first shared communication medium, the one or more first frequency bands being different from the one or more second frequency bands.

12. A node for use in a communication network including a shared communication medium, comprising:
a first communication module configured to transmit local data between the node and an additional node according to a first data protocol, using a first shared communication medium including at least one of an electrical cable and an optical cable;
a second communication module configured to transmit remote data between the node and a network hub according to a second data protocol that is different from the first data protocol, using the first shared communication medium; and
a processor and a memory, wherein the processor is configured to execute instructions stored in the memory to:
determine that a network resource required at the node is available at the additional node, and
in response to determining that the network resource is available at the additional node, access the network resource from the additional node using the first shared communication medium.

13. The node of claim 10, further comprising a wireless communication network control module for controlling one or more wireless base stations communicatively coupled to the first shared communication medium.

14. The node of claim 10, further comprising a content server for providing content to one or more other nodes communicatively coupled to the first shared communication medium.

15. The node of claim 12, further comprising a wireless communication network control module for controlling one or more wireless base stations communicatively coupled to the first shared communication medium.

16. The node of claim 12, further comprising a content server for providing content to one or more other nodes communicatively coupled to the first shared communication medium.

17. The method of claim 3, further comprising transmitting the remote data between the first node and the network hub using a backhaul communication medium between the first shared communication medium and the network hub.

18. The method of claim 3, wherein the first shared communication medium comprises a coaxial electrical cable.

* * * * *